United States Patent [19]

Newton et al.

[11] Patent Number: 4,564,293
[45] Date of Patent: Jan. 14, 1986

[54] FIBER OPTIC LOOP INTERFEROMETER AND METHOD WITH COINCIDENT BACKSCATTER ELIMINATION

[75] Inventors: Steven A. Newton, Palo Alto; Herbert J. Shaw, Stanford; Cassius C. Cutler, Palo Alto, all of Calif.

[73] Assignee: Board of Trustees of the Leland Stanford Junior University, Stanford, Calif.

[21] Appl. No.: 520,605

[22] Filed: Aug. 5, 1983

Related U.S. Application Data

[62] Division of Ser. No. 200,431, Oct. 24, 1980.

[51] Int. Cl.⁴ .................. G01B 9/02; G01C 19/64
[52] U.S. Cl. ......................................... 356/350
[58] Field of Search ........................................ 356/350

[56] References Cited

U.S. PATENT DOCUMENTS

| | | | |
|---|---|---|---|
| 4,088,898 | 5/1978 | Stitch | 356/350 |
| 4,265,541 | 5/1981 | Leclerc et al. | 356/350 |
| 4,280,766 | 7/1981 | Goss et al. | 356/350 |
| 4,283,144 | 8/1981 | McLandrich | 356/350 |

OTHER PUBLICATIONS

Lin et al., "Sensitivity Analysis of the SagNac-Effect Optical-Fiber Ring Interferometer", *Applied Optics*, Mar. 15, 1979, vol. 18, No. 6, pp. 915-931.
Y

*Primary Examiner*—Vincent P. McGraw
*Attorney, Agent, or Firm*—Knobbe, Martens, Olson & Bear

[57] ABSTRACT

Method and apparatus for improving the sensitivity of Sagnac gyroscopes and other interferometers utilizing a fiber optic loop by minimizing the effects of backscattered radiation. In one disclosed embodiment, the amplitude of coincident backscattered radiation is significantly reduced by applying the light in the form of a pulse of short duration and gating the output so that only the scattered energy from a short length of the fiber contributes to the interfering wave. The interference is reduced even further by processing or constructing the loop to eliminate the scattering sources in the short segment which can give rise to coincident backscattered power.

19 Claims, 6 Drawing Figures

FIBER OPTIC LOOP INTERFEROMETER AND METHOD WITH COINCIDENT BACKSCATTER ELIMINATION

This application is a division of application Ser. No. 200,431, filed 10-24-80.

This invention pertains generally to the measurement of light and more particularaly to interferometers and gyroscopes employing loops of fiber optic material in which counter rotating waves of light are monitored.

A Sagnac gyroscope is one form of an interferometer having a loop or ring of fiber optic material which carries counter rotating waves of light. The phases of the counter rotating waves are monitored at the output ends of the loop and compared to detect rotation of the loop.

Heretofore, the sensitivity of such instruments, e.g. the minimum measurable rotation rate, has been somewhat disappointing. While theoretical calculations indicate that such systems should be capable of measuring rotation rates as small as $10^{-3}$ degrees/hour, or less, practical systems heretofore constructed have had a sensitivity of only about 1-100 degrees/hour even with intergration times extending to many seconds.

The factors which have heretofore been recognized as limiting the accuracy of rotation measurement include residual non-reciprocal characteristics in the light path, non-homogenous environmental changes, quantum noise in the conversion of light to electrical signals, and electrical noise in the measuring system. However, none of these factors, independently or collectively, is of sufficient magnitude to account for the discrepancy between the theoretical performance of such systems and the performance actually observed.

It is also known that scattered radiation, due to inhomogeneities or imperfections in the fiber, produces a second pair of waves which propagate in the fiber. Heretofore, it has been thought that these secondary waves are in the nature of random noise or white noise which is not coherent with the primary waves and therefore not a significant factor in the discrepancy between predicted sensitivity and actual sensitivity.

Applicants have discovered that, contrary to prior belief, the secondary waves produced by backscattering are a significant factor which limits the sensitivity of Sagnac gyroscopes and causes errors in other fiber optic loop interferometers because they tend to be coherent with the primary waves. In existing systems, this error may have been unknowingly lessened to some extent by certain inherent and unavoidable factors which act to randomize the secondary waves and thereby reduce the coherence between the primary and secondary waves. For example, such systems may employ modulation which randomizes the phase of the secondary waves to some extent, although they are not intended to do so. Additional randomization may result from mechanical or thermal changes or from variations in the light source frequency. Prior to the present invention, however, the significance of back-scattering and the secondary waves was not recognized.

It is in general an object of the invention to provide a new and improved method and apparatus for increasing the sensitivity of a Sangac gryoscope and other interferometers employing a fiber optic loop.

Another object of the invention is to provide a method and apparatus of the above character in which the effect of backscattered radiation is substantially eliminated.

Another object of the invention is to provide a method and apparatus of the above character in which light is applied to the loop and monitored in a manner which tends to eliminate the effects of backscattering which is coincident with the primary wave.

Another object of the invention is to provide a method and apparatus of the above character in which the fiber optic loop is modified to eliminate coincident backscattering.

These and other objects are achieved in accordance with the invention in an interferometer or gyroscope having a loop of fiber optic material to which light is applied for travel in opposite directions. The light is monitored at predetermined points in the loop to detect the desired quantity, e.g. rotation rate of the loop. The light is applied and monitored in such manner that the effects of backscattered radiation excited by the light in the loop are minimized to avoid interference with the measurement. In one disclosed embodiment, the light is applied in the form of pulses of substantially shorter duration than the transit time of the light in the loop, and the light at the predetermined points is monitored only when the pulses are expected to be present at those points. In this way, the only backscattered radiation which can interfere with the measurement is that which is produced by the relatively narrow pulses in a short segment of the loop, and the effect of the backscattering is reduced even further by constructing the loop to avoid scattering in that small segment. In other embodiments, the applied light is frequency modulated or chirp modulated to avoid the effects of backscattering.

Figure 1:
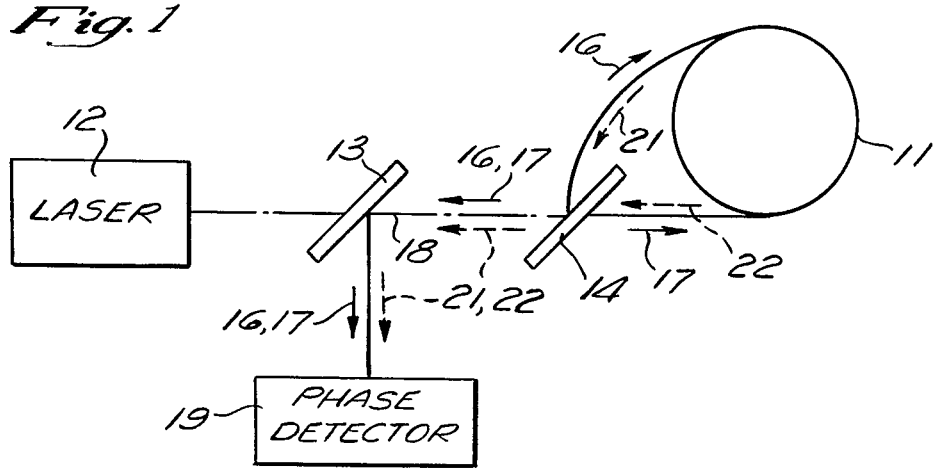
FIG. 1 is a schematic diagram of one embodiment of a Sagnac fiber optic loop interferometer gyroscope of the type to which the invention pertains.

As illustrated in FIG. 1, the Sagnac gyroscope includes a loop or ring 11 of fiber optic material. To provide identical paths for waves travelling in opposite directions around the loop, a single mode fiber is employed. The loop can have any desired size and number of turns, e.g. a diameter of 1 meter and an overall length of 1000 meters.

Light from a laser source 12 is applied to the ends of the loop via beam splitters 13, 14 to provide light waves 16, 17 which travel around the loop in opposite directions. As these waves emerge from the loop, they are directed together by beam splitter 14 along path 18 toward beam splitter 13, where they are redirected toward a phase detector 19. The use of two beam splitters instead of a single beam splitter helps to maintain optical reciprocity between the two waves since they each experience the same numbers of transmissions and reflections by the beam splitters.

As light waves 16, 17 travel around loop 11, imperfections and inhomogeneities in the fiber cause scattered radiation which produces a secondary pair of waves 21, 22 which propagate in the fiber. These backscattered waves, as viewed at the output of the loop, do not share the property of reciprocitity possessed by the primary or incident waves, and they can contain a component that cannot be treated merely as white noise as was previously thought. It has now been found that in a Sagnac interferometer these waves can produce interfering components in the output which can have a magnitude on the order of the sensitivity limitations heretofore experienced in such systems.

At least the parts of the scattered waves that are due to physical defects in the fiber and to Rayleigh scattering are temporally and spatially coherent, to some degree, with the two primary waves and add vectorially at unpredictable phases which are not identical for the two waves. If the source and system were absolutely stable, the error due to the secondary waves would be constant and could be calibrated, and would not limit the sensitivity or accuracy of this system. Conversely, if conditions were sufficiently variable, coherence could be completely destroyed, and the waves would simply contribute to shot noise, as previously assumed. In fact, however, if left alone, the secondary waves can produce an unpredictable error much larger than shot noise contributions.

The forward component of the scattered radiation appears to have little effect on the uncertainty in phase, and appears to be reciprocal, affecting each of the oppositely directed waves in a similar manner. The part of the scattered radiation that falls within the acceptance angle of the fiber in the reverse direction, however, provides the secondary waves that interfere with the primary or desired counterpropagating waves.

An estimate of the magnitude of the phase uncertainty due to backscattered radiation in a fiber loop can be made from relatively simple calculations. For an attentuation of exp $(-\alpha_s L)$ due to Rayleigh scattering and lost energy uniformly scattered over the length of the fiber with a scattering directivity (G) along the fiber, the fraction of the total scattered energy which is captured by the fiber core is $G\beta^2/4$, where $\beta$ is the acceptance angle of the fiber core and ordinarily $1 < G < 1.5$. Typical values of G and other parameters are set forth in the following table:

TABLE 1

| Symbols | Parameters | Typical Values |
|---|---|---|
| $\lambda$ | Wavelength | 1.0 micron |
| c | Free space velocity of light | $3 \times 10^8$ m/s |
| n | Refractive index of fiber | 1.5 |
| N | Number of turns in length L | 318 |
| D | Loop diameter | 1.0 meter |
| $\beta$ | Capture angle of fiber | 0.1 radian |
| G | Directional gain | 1.0 |
| $\alpha_s$ | Attentuation constant | $1.2 \times 10^{-4}$ m$^{-1}$ ($\sim$0.5 dB/km) |
| L | Fiber length | 1000 m |

For a loop length L and small attentuation, the ratio of the power in the backscattered secondary wave to the power in the primary wave after one circulation is given by:

$$P_s/P_1 \approx \tfrac{1}{4} G\beta^2 \alpha_s L.$$

The two counter rotating pairs of waves can combine to give a maximum phase deviation of:

$$\phi_{max} = 2(P_s/P_1)^{\frac{1}{2}} = \beta(G\alpha_s L)^{\frac{1}{2}}$$

which, for any single measurement, is indistinguishable from a phase shift induced by rotation. The rotation rate that correspondends to this phase deviation is obtained by using the well known Sagnac formula, and is given by:

$$\Omega_{max} = \frac{\lambda c}{2N(\pi D)^2} \times \beta(G\alpha_s L)^{\frac{1}{2}}$$

or, substituting $N = L/\pi D$:

$$\Omega_{max} = \frac{\lambda c \beta}{2\pi D}\left(\frac{G\alpha_s}{L}\right)^{\frac{1}{2}}.$$

Using the values given in Table 1 for a single circulation for transit around a multi-turn loop, this expression gives a maximum phase error ($\phi_{max}$) of 0.035 radians, which linearly translates to a rotation error of up to 0.095 degrees per second, or 341 degrees per hour.

As noted above, the error due to scattering is probably lessened somewhat in existing fiber gyroscopes due to certain factors which can tend to reduce the coherence between the primary and secondary waves, although they were not intended to do so. Such systems may, for example, employ modulation which serves to randomize the phase of the scattered waves to some extend, although that is not the purpose for which the modulation is employed. Likewise, some degree of randomness may occur because of mechanical and thermal changes, and variation in laser frequency can also produce some randomization. Notwithstanding these factors, the contribution of backscattering to the overall error can still be significant or even dominant.

By applying the light to the fiber loop in the form of a pulse of relatively short duration (e.g. 1 nanosecond) and monitoring the output only during the relatively short interval when this pulse is expected to be present, a significant reduction can be made in the amplitude of the coincident backscattered radiation. In this way, the scattering which contributes to the part of the secondary wave which interferes is limited to a relatively short segment, e.g. 1/5 meter, of the fiber. This short segment can be specially processed or constructed to reduce scattering therein, thereby further reducing the effect of backscattered radiation on the output measurement.

Figure 2A:
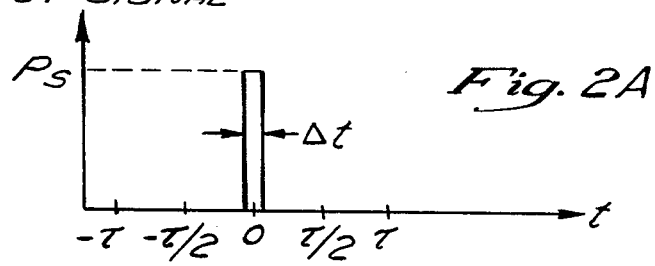
FIGS. 2A and 2B are graphical representations illustrating the effect of backscattered radiation in the embodiment of FIG. 1.
Figure 2B:
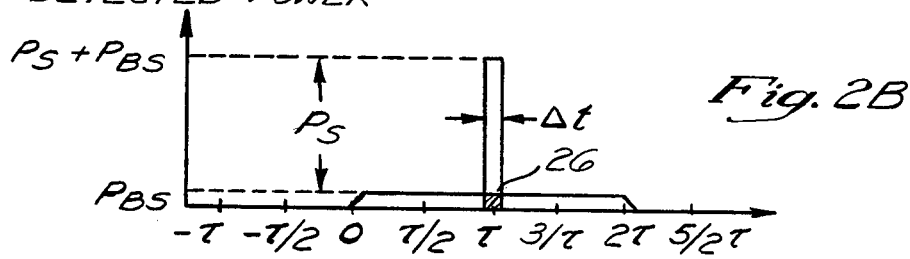

FIGS. 2A and 2B illustrate the effect of launching a square pulse having an amplitude $P_s$ and a duration $\Delta t$ into the loop at time $t=0$. The total path length around the loop is L, and the transit time for the pulse around the loop (neglecting the Sagnac effect) is $\tau = (nL)/c$. It is assumed that the loop is lossless and that the duration of the input pulse is substantially less than the transit time, i.e. $\Delta t << \tau$. Neglecting dispersion, this short pulse will be well localized within a short segment of the loop at any given instant.

The signal pulse itself ($P_s$) is detected one transit time ($t=\tau=(nL)/c$) after it is launched. Also detected is a uniform level of backscattered power ($P_{BS}$) which arrives at the output between $t=0$ and $t=2\tau$. The large spread in the arrival times of the backscattered power reflects the range of round trip transit times between the input/output and the locations of the scattering centers around the entire loop. In general, backscattered power attributable to scattering sources located at a distance $x=FL$ around the loop is detected at a time $t=2F\tau$, where F is any fraction up to 1.

By gating the output signal, all of the backscattered power ($P_{BS}$) except the relatively small portion received coincidentally with the input pulse ($P_s$) is eliminated from the output signal. The coincident portion of the backscattered power is shaded and designated by the reference numeral 26 in FIG. 2B. This represents a substantial improvement over the prior art where the light was applied in the form of a continuous wave or a pulse having a length on the order of the transit time and the entire path of the loop was always filled with light. In such a system, every scattering source along the path is excited by the input light at any given instant. The continuous wave case is equivalent to applying a continuous series of pulses of duration $\Delta t$ to fill the interval between $t=0$ and $t=2\tau$. The number ($N_{cw}$) of pulses required to fill this interval is $$N_{cw} = \frac{2\tau}{\Delta t}.$$

With $N_{cw}$ pulses, the backscattered power is $N_{cw}$ times the backscattered power produced by one pulse. Thus, by using a pulse of duration $\Delta t$, the simultaneously detected backscattered power can be reduced from the continuous wave case by a factor of:

$$\frac{P_{BS}}{N_{cw}P_{BS}} = \frac{1}{N_{cw}} = \frac{\Delta t}{2\tau} = \frac{c}{2nL}\Delta t$$

A one nanosecond pulse, a refractive index of 1.5, and a loop length of 1000 meters, the reduction in coincidence backscattered power is on the order of $10^4$.

The backscattered power in coincidence with the direct pulse is detected during the interval $$\tau - \frac{\Delta t}{2} \leq t \leq \tau + \frac{\Delta t}{2}.$$

This radiation originates solely from scattering sources located along a corresponding segment of the fiber halfway around the loop in the interval $$\frac{L}{2} - \frac{c\Delta t}{2n} \leq x \leq \frac{L}{2} + \frac{c\Delta t}{2n}.$$

If the input pulse is made shorter, the sources of the unwanted backscattered power are reduced in number and are restricted to a shorter segment of the fiber whose length is given by $$\Delta x = \frac{c}{n}\Delta t.$$

For example, for $n=1.5$ and $\Delta t=1$ ns, the segment of the fiber which gives rise to the undesired backscattered power would have a length of only 0.2 meter.

It is clear therefore, that once the duration of the signal pulse is known, the exact position and extent of the fiber segment containing the sources of coincident backscatter are known as well. Such a segment can then be identified and, if desired, physically isolated from the rest of the system. If the backscattering sources in this short segment of the light path can be reduced, a further improvement in the signal-to-noise ratio and the sensitivity of the system will result.

Figure 3:
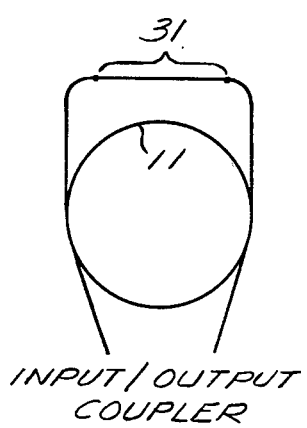
FIGS. 3-5 are fragmentary schematic diagrams of additional embodiments of interferometers incorporating the invention.

As illustrated in FIG. 3, one method of eliminating sources of scattering in the portion of the loop which gives rise to coincident backscatter radiation is to use a short segment 31 of very pure fiber in this region. The remainder of the loop be fabricated of less expensive, lower grade fiber, and coupling between the fiber section can be effected by any suitable means. The segment of higher quality fiber is preferably made somewhat longer than the interval of interest, i.e. length $>(c/n)\Delta t$ so that any scattering at the interfaces of the fiber sections will not contribute to the coincident radiation.

Likewise, a hollow light guide, or "light pipe" can be employed in the region where scattering is to be avoided. A suitable light pipe comprises a tube fabricated of a dielectric or metal material having an axially extending bore through which the light is transmitted. Scattering is minimized in the light pipe because the guiding medium (air or vacuum) has few, if any, scattering sources. In addition, the walls of the guide have a higher index of refraction than the guiding medium, and any light scattered within these walls will tend to remain there. The fiber segments can be coupled to the hollow guide by any suitable means, and the length of the guide is preferably made longer than the region of interest so that any scattering at the interfaces between the fiber and the guide will not give rise to coincident radiation.

Figure 4:
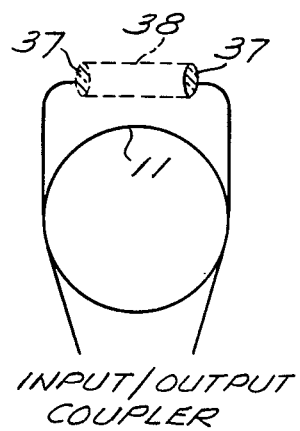

In the embodiment of FIG. 4, scattering sources are eliminated by forming a gap 36 in the fiber and coupling the light between the remaining fiber sections by means of lenses 37. These lenses are preferably positioned outside the region which would give rise to coincident scatter, and the region between the lenses is protected from dust and other impurities by a shield 38. If desired, the region between the lenses can be evacuated to eliminate scattering sources completely.

Figure 5:
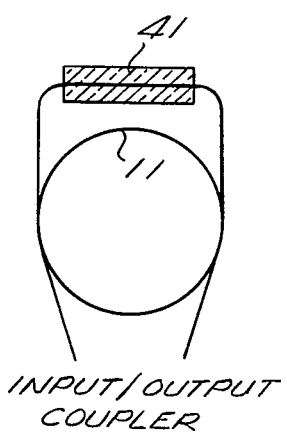

In the embodiment of FIG. 5, the portion of the fiber which can give rise to coincident backscatter is surrounded by a medium 41 having an index of refraction substantially identical to the index of the fiber cladding. This can be done, for example, by imersing the segment of fiber in an index matching fluid. Without the index matching medium, scattered radiation reaching the interface between the fiber cladding and the surrounding air is reflected back into the fiber since the index of the cladding is greater than the index of air. With the matching medium, however, the scattered radiation which reaches the interface between the cladding and the medium is transmitted into the medium and thus removed from the fiber.

As noted above, by applying and detecting only a short pulse of light, an improvement in noise reduction and sensitivity on the order of $10^4$ over the continuous wave case is realized. By processing or constructing the fiber to eliminate scattering in the region which gives rise to coincident radiation, an additional improvement on the order of 10-100 can be realized, making an overall improvement in backscatter effect on the order of $10^5$–$10^6$ over existing systems.

Reductions in coincidence backscattered power can also be effected by chirp modulation or frequency modulation of the applied light. Using chirp pulses has the additional advantage of spreading the width of the pulse which is transmitted through the fiber, thereby reducing the effective peak power of the pulse and eliminating any possibility of overloading in the fiber. Wideband frequency modulation likewise permits the use of even wider pulses with lower peak power.

It is apparent from the foregoing that a new and improved method and apparatus have been provided for eliminating noise and increasing the sensitivity of Sagnac gyroscopes and other interferometers utilizing a loop of fiber optic material. While only certain presently preferred embodiments have been described in detail, as will be apparent to those familiar with the art, certain changes and modifications can be made without departing from the scope of the invention as defined by the following claims.

We claim:

1. An interferometer comprising:
   a loop of fiber optic material;
   means for introducing a first light pulse and a second light pulse into said loop, said first and second light pulses having opposite directions of travel in said loop so that said first and second light pulses overlap in a predetermined segment of said loop;
   means for combining said first and second light pulses to form an interference pattern; and
   means for monitoring the interference pattern, said monitoring means being responsive to backscattered waves which originate only in said predetermined segment;
   wherein said predetermined segment of said loop is formed of an optical fiber having a greater degree of purity than the fiber optic material which comprises the remainder of said loop.

2. An interferometer comprising;
   a loop of fiber optic material;
   means for introducing a first light pulse and a second light pulse into said loop, said first and second light pulses having opposite directions of travel in said loop so that said first and second light pulses overlap in a predetermined segment of said loop;
   means for combining said first and second light pulses to form an interference pattern;
   means for monitoring the interference pattern, said monitoring means being responsive to backscattered waves which originate only in said predetermined segment; and
   means for removing scattered radiation only from said predetermined segment of said loop, said predetermined segment being a small portion of the entire loop.

3. An interferometer according to claim 2 wherein said removing means includes an index-matching substance around said predetermined segment, said index-matching substance having an index of refraction substantially identical to the index of refraction of the cladding of said predetermined segment.

4. An interferometer comprising:
   a loop of fiber optic material;
   means for introducing a first light pulse and a second light pulse into said loop, said first and second light pulses having opposite directions of travel in said loop so that said first and second light pulses overlap in a predetermined segment of said loop;
   means for combining said first and second light pulses to form an interference pattern;
   means for monitoring the interference pattern, said monitoring means being responsive to backscattered waves which originate only in said predetermined segment;
   wherein said introducing means comprises means for applying to said loop pulses having substantially shorter duration than the transit time of light in said loop; and
   wherein said introducing means includes means for modulating the frequency of said light pulses in an amount effective to spread the width of said pulses in said fiber optic material to reduce the effective peak power.

5. An interferometer according to claim 4 wherein said introducing means includes means for applying chirp modulated light signals to said loop.

6. An interferometer, comprising:
   a first loop of fiber optic material;
   a second loop of fiber optic material
   first means for introducing a first pulsed light signal into said first loop;
   second means for introducing a second pulsed light signal into said second loop;
   coupler means for introducing the first light signal into the second loop after the first light signal has propagated through the first loop and for introducing the second light signal into the first loop after the second light signal has propagated through the second loop;
   means for combining said first and second light signals to form an interference pattern; and
   detector means for monitoring the interference pattern only when backscattered waves originating in said coupler means are incident upon said detector means.

7. An interferometer according to claim 6 wherein said coupler means includes lens means for focusing light signals output from each of said first and second loops for input to the other of said first and second loops.

8. An interferometer according to claim 6 wherein said coupler means comprises;
   a pair of lenses mounted between the first and second loops; and
   an evacuated shield means for enclosing said lenses to substantially eliminate light scattering sources from said coupler means.

9. An interferometer according to claim 6 wherein said coupler means includes a hollow light guide.

10. An interferometer according to claim 6 wherein said first loop and said second loop having substantially identical lengths.

11. An interferometer according to claim 6 wherein said first introducing means includes means for applying to the first loop pulses of light having substantially shorter duration than the transit time of light in said first loop, and wherein said second introducing means includes means for applying to said second loop pulses of light having substantially shorter duration than the transit time of light in said second loop.

12. An interferometer according to claim 11 wherein said first introducing means includes means for applying frequency modulated light pulses to said first loop and wherein said second introducing means includes means for applying frequency modulated light pulses to said second loop.

13. An interferometer according to claim 11 wherein said first introducing means includes means for applying chirp modulated light signals to said first loop and wherein said second introducing means includes means for applying chirp modulated light signals to said second loop.

14. A method for controlling the effects of backscattered radiation in an interferometer including a loop of fiber optic material, comprising the steps of:
   introducing a first light pulse and a second light pulse into the loop of fiber optic material so that the first and second light pulses travel in opposite directions in the loop and overlap in a predetermined segment of the loop;

combining the first and second light pulses to form an interference pattern;

monitoring the interference pattern only when backscattered waves originating in the predetermined segment of the loop in which the first and second light pulses overlap are output from the loop; and frequency modulating the first and second light pulses in an amount effective to spread the width of said pulses in said fiber optic material to reduce the effective peak power.

15. A method for controlling the effects of backscattered radiation in an interferometer including a loop of fiber optic material comprising the steps of:

introducing a first light pulse and a second light pulse into the loop of fiber optic material so that the first and second light pulses travel in opposite directions in the loop and overlap in a predetermined segment of the loop;

combining the first and second light pulses to form an interference pattern;

monitoring the interference pattern only when backscattered waves originating in the predetermined segment of the loop in which the first and second light pulses overlap are output from the loop; and chirp modulating the first and second light pulses in an amount effective to spread the width of said pulses in said fiber optic material to reduce the effective peak power.

16. A method for controlling the effects of backscattered radiation in an interferometer including a loop of fiber optic material, comprising the steps of:

introducing a first light pulse and a second light pulse into the loop of fiber optic material so that the first and second light pulses travel in opposite directions in the loop and overlap in a predetermined segment of the loop;

combining the first and second light pulses to form an interference pattern;

monitoring the interference pattern only when backscattered waves originating in the predetermined segment of the loop in which the first and second light pulses overlap are output from the loop; and enclosing only the predetermined segment of the loop with a substance having an index of refraction substantially equal to the index of refraction of the cladding of the loop of fiber optic material.

17. A method for controlling the effects of backscattered radiation in an interferometer, comprising the steps of:

forming a first loop of fiber optic material;

forming a second loop of fiber optic material introducing a first light pulse into the first loop;

introducing a second light pulse into the second loop;

introducing the first light pulse into the second loop through coupler means after the first light pulse has propagated through the first loop;

introducing the second light pulse into the first loop through the coupler means after the second light pulse has propagated through the second loop;

combining the first and second light pulses to form an interference pattern; and monitoring the interference pattern with a detector only when backscattered waves originating in the coupler means are incident upon the detector.

18. A method according to claim 17 further including the steps of:

frequency modulating the first light pulse; and
frequency modulating the second light pulse.

19. A method according to claim 17 further including the steps of:

chirp modulating the first light pulse; and
chirp modulating the second light pulse.

* * * * *